Nov. 6, 1928.  
D. C. SMITH  
1,690,462  
MOLD FOR CONCRETE BLOCKS  
Filed Feb. 15, 1927  
2 Sheets-Sheet 1

Inventor  
David C. Smith  
By Faust F. Crampton  
Attorney

Nov. 6, 1928.                                            1,690,462
D. C. SMITH
MOLD FOR CONCRETE BLOCKS
Filed Feb. 15, 1927          2 Sheets-Sheet 2
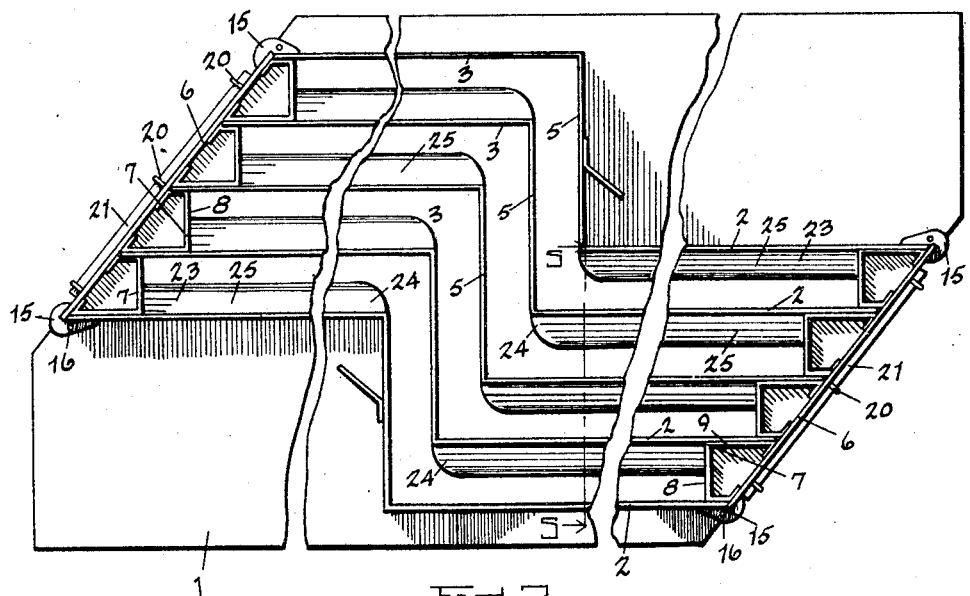
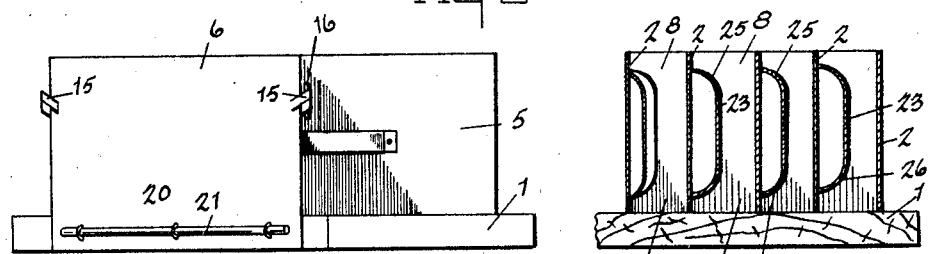
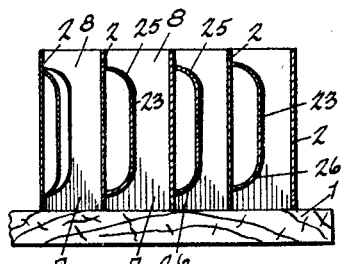
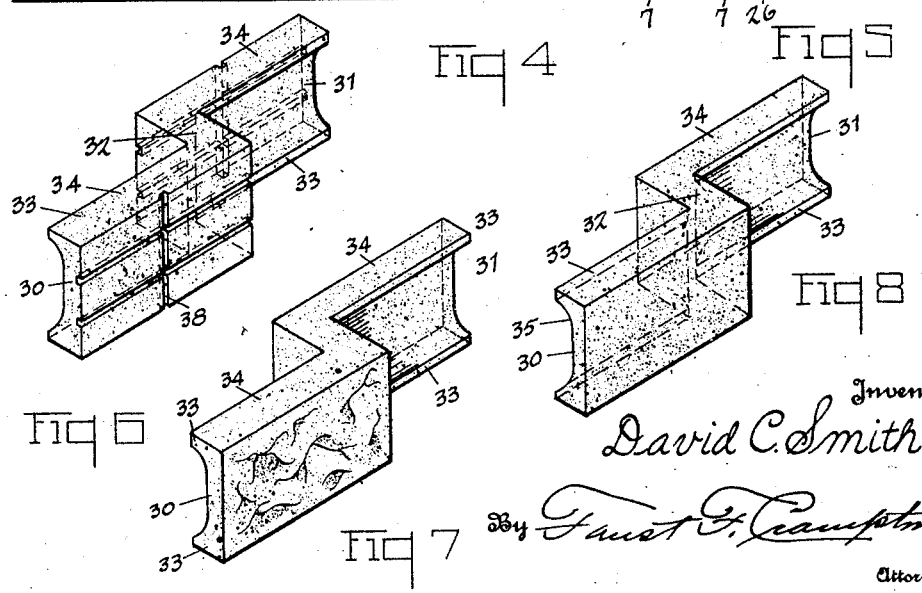

Patented Nov. 6, 1928.

1,690,462

UNITED STATES PATENT OFFICE.

DAVID C. SMITH, OF TOLEDO, OHIO, ASSIGNOR, BY MESNE ASSIGNMENTS, TO KADOW FOUNDATION, INCORPORATED, OF TOLEDO, OHIO, A CORPORATION OF DELAWARE.

MOLD FOR CONCRETE BLOCKS.

Application filed February 15, 1927. Serial No. 168,320.

My invention has for its object to provide an efficient mold for cement blocks whereby a plurality of cement blocks of peculiar construction for wall building may be made at the same time by pouring, tamping or shaking, or whatever process may be followed in molding blocks to shape. The invention particularly provides a means whereby blocks having laterally extending flanges, both at the top and the bottom, may be formed on the parts of the block that constitute wall forming parts, thus producing extreme lightness in the blocks having flanges, that extend in the direction with respect to the block, as to permit a certain amount of elasticity in the block which enables it to adjust itself to settling of the wall without fracture of the blocks and yet so as to resist torsional strain provided the flexure of the block exceeds a certain point as to cause any torsional strain on the wall forming part of the block, and, furthermore, to provide mortar areas for supporting the block and supporting the contiguous blocks of the upper contiguous course.

My invention particularly provides a means for forming light weight blocks for double wall building which is so constructed that the double wall may be formed of contiguous blocks. The mold is so constructed that its parts may be separated from the molded or shaped blocks and the molded or cast blocks withdrawn in succession from the mold.

The invention may be contained in molds that vary in shape and in the details of their construction, and to illustrate a practical application of the invention, I have selected one of such constructions as an example of molds containing my invention and shall describe it hereinafter. The mold selected is shown in the accompanying drawings.

Figure 1:
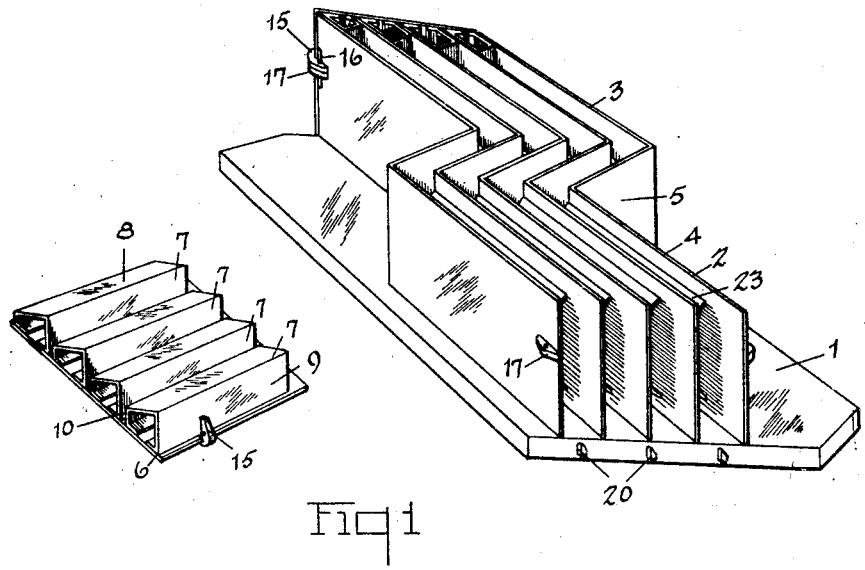
Figure 2:
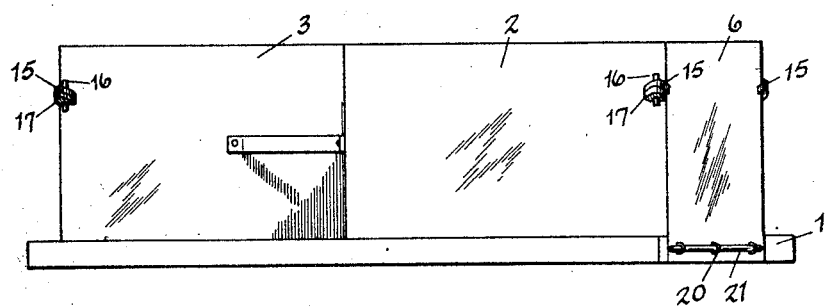

Fig. 1 is a perspective view of the mold, the end plate being shown removed which is also shown in perspective in the figure. Fig. 2 is a side view of the mold. Fig. 3 is a top broken view of the mold. Fig. 4 illustrates an end view of the mold. Fig. 5 is a view of a section taken on the plane of the line 5—5 indicated in Fig. 3. Fig. 6 illustrates one form of block that may be cast or molded in the mold. Fig. 7 illustrates a view of another block that may be cast in the mold and Fig. 8 illustrates a third form of block that may be cast in the mold.

The mold is formed of a base or board 1 on which may be located a plurality of frames 2 that may be formed of cast iron or other metal which will sufficiently resist any flexure due to the expansion of the cement in setting. Preferably, the frames are formed of cast iron in order to resist any bending that may be caused in the center of the frame due to the expansion of the cast cement. The frames are provided with portions 3 and 4 that are located in parallel and spaced planes and extend in opposite directions from a part 5 that joins the parts 3 and 4. The parts 3 and 4 are located at right angles to the part 5 in each case and extend from the ends of the part 5. The frames are located in stepped relation with respect to each other and so as to place the parts 3 of the frames equi-distant from each other and also to place the parts 5 equi-distant from each other. This will locate the parts 4 equi-distant from each other. The frames are located at right angles to the base 1 and their ends are secured in their spaced relation by means of the end plates 6 which are provided with a plurality of ridges 7 having plane surfaces 8 that extend at right angles to the surfaces of the parts 3 and 4 in each case when the end plates are located in position. Since the ends of the frames will be located in a plane at an angle to the parallel planes of the parts 3 and 4, the ridges 7 protrude from the bodies of the end of plates 6 at an angle to form the surfaces 9 and 10 which may be located in contact with the surfaces of the end portions of the parts 3 and 4. Thus the surfaces 9 and 10 of adjoining ridges 7 are located in opposition to each other and are separated from each other a distance equal to the thicknesses of frames and so that when the end plates 6 are closed or placed in position at the ends of the frames, the end portions of the frames will fit between the ridges. The ends of the end plates are provided with hooks or lugs 15 that extend over the edges of the outermost frames and so as to secure the edge portions of the outermost frames against the adjoining ridges 7 of the end plates 6. If desired, pins 16 may be inserted through the lugs 15 and also through lugs 17 that may be formed on the outer surfaces of the outer frames and so as to be engaged by the pins 16 that extend through the lugs 15, the lugs 17 being provided with suitable openings for receiving the pins 16 and which are so located as to register with the openings formed in the lugs 15 when the end plates are placed in position. Thus the plates 6 may be located so as to secure the frames in their relative positions and locked by means of the pins 16. If desired, staples or eyes 20 may be located on the base 1 and suitable slots may be formed in the lower edges of the end plates 6 for receiving the staples 20 and the pin or rod 21 may be placed in the staples 20 so as to coact with the pins 16 to lock the plates in position.

In order to produce flanges at the upper and lower edges of the wall forming parts of the blocks for supporting mortar and more particularly for resisting extreme torsional movements of the wall forming parts relative to the wall bonding parts of the blocks, and yet permit elastic or yielding movement in the wall forming parts of the blocks so that the blocks may adjust themselves to a large degree to strains due to variations in the settlement of the double wall formed by the blocks or of a part of one wall relative to the corresponding part of the other wall, the parts 4 of each of the frames are provided with raised portions extending near the upper and lower edges of the said parts and on the same side, that is, on the left side of each of the frames when looking at the ends of the parts 4 of the frames as shown in Fig. 1. Similar raised portions are located on the opposite sides of the frames but on the parts 3. This produces hollowed-out portions or forms flanges having curved sides at the points where the flanges join the body portions of the wall forming parts of the blocks, the said flanges extending inwardly with respect to the wall forming parts, to permit resiliency as to any vertical movement, but to resist extreme torsional strains of the block relative to the bonding part which is formed between the parts 5 of the frames of the mold. The parts 5 do not have any raised portions or flanges leaving the said bonding parts substantially solid, that is, without any depressed portions therein. The raised portions of the parts 3 and 4 may be cast integral with the frames 2 provided they are formed of cast iron or they may be formed of sheet metal and electrically welded to the parts 3 and 4. As shown in the drawings, the raised portions are formed of sheets 23 that extend from near the ends of the frames to the parts 5 where they are curved inwardly as at 24. The raised parts 23, that is, the sheet metal parts, have curved upper and lower portions as indicated at 25 and 26. This will form a block having thin wall forming parts but inwardly extending flanges for the purpose described, the thin wall forming parts joining the bonding parts by curved surfaces that will be formed by the curved surface 24 of the inner ends of the plates 23. The outer end of the plates 23 abuts squarely against the surfaces 8 of the ridges 7 of the end plates 6. When, therefore, the end plates are locked in position the blocks may be cast by pouring or shaking or tamping and when the cement has set, jarring will permit opening of the ends and drawing of the frames one by one as the cast blocks are shifted on the base 1 and removed.

The particular block that may be formed in the mold shown in Figs. 1 to 5 inclusive, is illustrated in Fig. 8 which has the wall forming parts 30 and 31 and the bonding part 32 that bonds together the two walls of the double wall formed by the blocks. The blocks may be laid with either edge up and with one of the wall forming parts extending in either direction. The thin wall forming parts 30 and 31 are provided with flanges 33 that extend inwardly with respect to the double wall of which the block forms a part. The flanges and the body of the wall forming parts 30 and 31 have plane surfaces 34, that form the upper and lower edges of the block, and the curved surface 35, substantially as shown in the Figs. 6, 7, and 8, conform to the curved surfaces 25 of the mold. The parts 30 and 31 are joined to the bonding part 32 and so as to extend at right angles to the bonding part. The parts of the block are joined by the curved surface that is formed by the curved surface 24 of the mold. Inasmuch as the wall bonding part 32 extends at right angles to the wall forming parts 30 and 31 and the bonding part 32 is solid, that is, does not have flanges, and inasmuch as the flanges 33 of the wall forming parts extend inward with respect to the double wall of which the block forms a part and are joined to the bonding part 32, it has been found that such a block may be made one-half the weight, by reason of the thin walls of the wall forming part, of another block having substantially the same shape and same dimensions except for the thickness of the wall forming part, the thickness being the same as the width of the flanges of the block shown in Fig. 8 and yet will sustain the same pressure as the solid block and a greater torsional pressure than the solid block.

Inasmuch as the mold is so constructed that the frames are drawn, one by one, from the lateral faces of the blocks, and the blocks are likewise drawn laterally from the faces of succeeding frames, the frames may be provided with configurations or contours of any desired shape within, however, the limitations that the lateral drawing of the frames from the blocks and the blocks from the frames requires. Thus the faces of the blocks may be provided with keying slots such as the slots 38 shown in the form of the block illustrated in Fig. 6 whereby stucco may be formed on the blocks, or the face of one side of the block, namely, one wall forming part of the block, may be provided with one configuration and the other wall forming part may be formed into another configuration. Thus one wall forming part may be shaped for securing stucco and the other wall forming part may be shaped to secure plaster or a finishing coat. Also, if desired, one wall forming part, such as the part 30 of the block shown in Fig. 7, may be made to imitate broken stone and the other wall forming part may be made smooth or may be shaped as may be desired according to whether or not a coating is to be placed thereon and also as to the character of the coat that it is intended to apply thereto. The shape and form of the faces of the blocks may be thus greatly varied, the blocks shown in Figs. 6, 7, and 8 being merely illustrative of some of the possible configurations that may be formed thereon by reason of the manner in which the mold is constructed and particularly because of the manner in which the parts of the mold are separated in removing the cast blocks.

I claim:

1. In a mold for cement blocks, a plurality of frames, each frame formed of three connected parts, two of the parts extending at an angle to and from the ends of the third part and forming end parts of the frame, a base for supporting the frames on their edges, the corresponding parts of the frames being located in substantially parallel relation, end plates having ridges for spacing the frames, means for removably connecting the end plates to the frames, the faces of the end parts of the frames having projecting parts for shaping the faces of the blocks.

2. In a mold for cement blocks, a plurality of frames, each frame formed of three connected parts, two of the parts extending at an angle to and from the ends of the third part and forming end parts of the frame, a base for supporting the frames on their edges, the corresponding parts of the frames being located in substantially parallel relation, end plates having ridges for spacing each frame, the faces of the end parts of each frame having projecting parts for shaping faces of the blocks and means for locking the frames and the end plates to the base.

In witness whereof I have hereunto signed my name to this specification.

DAVID C. SMITH.